Patented June 13, 1950

2,511,115

UNITED STATES PATENT OFFICE 2,511,115

FREE-FLOWING NUT PRODUCT

Wilbur A. Lazier, Birmingham, Ala., and Joseph F. Vincent, Milledgeville, Ga., assignors to Stevens Industries, Inc., Dawson, Ga., a corporation of Georgia No Drawing. Application September 20, 1947, Serial No. 775,378

6 Claims. (Cl. 99—128)

This invention relates to a free-flowing nut product. More particularly it concerns a novel free-flowing preparation derived from peanuts and composed of exceedingly fine, solid particles of cellular and protein materials dispersed in peanut oil. Such a preparation is obtained by grinding shelled peanuts to such a fine state of subdivision that the particle size of the solids contained therein is reduced to microscopic proportions.

It has long been the practice to comminute edible nuts to form so-called "nut butters." The degree of subdivision has varied from a rather coarse grind in the case of ordinary peanut butter to relatively fine particles in the smooth peanut butters that have become popular in recent years. A "chunky" variety is also produced by distributing coarse pieces of nut meats more or less uniformly throughout a peanut butter of finer grind. All such nut butters are substantially solid, their consistency being such as to require the application of a knife or the like in order to spread them. On the other hand, the novel products of this invention are characterized by a high degree of fluidity and a dispersibility in aqueous media unlike that of any nut product heretofore disclosed.

The main object of our invention is to provide a novel nut product that may be employed for many purposes for which the nut butters heretofore produced are not suitable. Another object is to produce a preparation from peanuts that possesses distinctly different physical properties than do the ordinary peanut butters, such as the ability to flow freely. A further object is to provide a nut product containing a far higher proportion of free nut oil than has heretofore been attained, together with solid particles which are reduced to extremely minute dimensions. Additional objects will become apparent as the description of our invention proceeds.

We have found that by grinding shelled nuts, either cooked or uncooked, until essentially all the solid particles in the resultant product have been reduced to microscopic size, a much greater proportion of nut oil is released and a free-flowing product is formed that is quite different from any nut product known heretofore, and is susceptible to many uses for which the known products are not suited. The grinding of the nuts to this extremely fine state of subdivision is preferably carried out in a colloid mill. Our new products, prepared in this fashion, will flow like syrup, and no grains are apparent to the touch or to the eye.

The grinding may also be accomplished in a suitable hammer mill equipped with a fine screen with a mesh-size of the order of 0.27 inch. Two or even three passages of the material through the mill will produce a finer product than one grinding. The starting material may be peanut halves, whole peanuts, or a more coarsely ground peanut butter.

Laboratory studies extending over a period of years have established that comminuted nut products can be successfully and reproducibly characterized physically by a number of methods, and that the results so obtained can be correlated with the properties of consistency, stiffness, and spreadability which affect consumer acceptance of the products.

Three very useful methods have been developed for application to the problem as follows: (1) Determination of the consistency by measuring the degree of penetration of a sharp instrument under a given force for a given time, or by determining the rate of rotation of a stirrer paddle under a given torque. Standard laboratory instruments for measuring these properties are known as the penetrometer and the Stormer viscosimeter, respectively. (2) The distribution of particle size may be determined by a standard screen analysis through sieves of known dimensions. In this method the oil must first be removed to convert the comminuted nut product to a free-flowing powder. (3) Lastly, microscopic examination with the aid of a stage or ocular micrometer will reveal the condition of such materials as will pass through the finest microscopic screen openings.

By the above methods we have determined that, as the efficiency of grinding is increased, the fluidity of the nut product increases, the penetrometer reading rises, and the screen analysis shows an increasing proportion of material passing through the finer mesh screens. Simultaneously the nut product acquires certain other novel properties useful for blending, as will be described hereinafter. These effects can be achieved, for example, by grinding blanched, roasted peanuts in a colloid mill having a carborundum rotor set at a clearance of not more than 0.010 inch.

To illustrate the marked differences in the properties of our products and those of the prior art products, it is only necessary to carry out the following penetrometer tests:

A representative sample of commercial peanut butter at 25° C. is placed in a cylindrical crystallizing dish 8 cm. in diameter and 5 cm. high, taking care to leave no air pockets and to have the top of the butter smooth and level with the edge of the dish. The dish is then placed on the stage of a Precision Universal A. S. T. M. Penetrometer, Designation D 217, and the point of the standard cone-shaped plunger is lowered until it just makes contact with the surface of the sample. The plunger, with no weights added, is released for exactly one minute and the depth of penetration in millimeters is read from the instrument dial.

With our novel, extremely finely ground peanut products penetrations of from 32 to 41 mm. are obtained, whereas the peanut butters of the prior art give penetrations under the same conditions ranging from 25 to 30 mm. A ground peanut product having penetrations in the 35 to 41 mm. range will exhibit gravity flow characteristics at room temperature whereas products having penetrometer readings of 30 mm. or below exhibit characteristics bordering on those of rigid solids. When inverted in a container, such as a jelly glass, the products of our invention will flow out readily, whereas the products of the prior art will remain in the container intact. To convert the prior art products to the gravity-flowing products of this invention, it is necessary to subject them to further, more intensive grinding in suitable colloid mills.

Prior to our investigations, scarcely any attention had been given to the importance of particle size and distribution of particle size in comminuted nut products. Exhaustive studies have led us to adopt the following method of characterizing such products by screen analysis:

About three-fourths of a pound of peanut butter is extracted with three 300 cc. portions of hot benzene followed by two extractions with 300 cc. of warm petroleum ether. The oil-bearing solvent is removed by vacuum filtration. After drying several hours in a large evaporating dish, the meal is subjected to a Ro-Tap sieve analysis using A. S. T. M. Standard E-11-39 sieves. Shaking is continued for two hours, after which the percent by weight retained on each screen is calculated.

The following tabulation shows the results of screen analyses of two typical prior art peanut butters. The first is a popular brand having what is known in the trade as a "medium" grind; the second is a popular brand of the "fine" grind variety:

*Table I*

|  | Prior Art Peanut Butters | |
| --- | --- | --- |
|  | Medium Grind | Fine Grind |
|  | *Percent* | *Percent* |
| Retained by 60 mesh sieve | 15.0 | 1.6 |
| Retained by 80 mesh sieve | 5.1 | 1.1 |
| Retained by 100 mesh sieve | 2.0 | 2.8 |
| Retained by 200 mesh sieve | 5.0 | 4.9 |
| Retained by 325 mesh sieve | 31.8 | 77.9 |
| Through 325 mesh sieve | 40.8 | 11.4 |
| Total recovered | 99.7 | 99.7 |

By way of comparison, corresponding screen analyses on several gradations of the exceedingly fine, gravity-flowing, comminuted peanut products of this invention are given below:

*Table II*

|  | Products of This Invention | | |
| --- | --- | --- | --- |
|  | Sample 1 | Sample 2 | Sample 3 |
|  | *Percent* | *Percent* | *Percent* |
| Retained by 60 mesh sieve | 0.1 | 0.0 | 0.0 |
| Retained by 80 mesh sieve | 0.8 | 0.1 | 0.0 |
| Retained by 100 mesh sieve | 0.3 | 0.1 | 0.0 |
| Retained by 200 mesh sieve | 4.7 | 1.6 | 1.2 |
| Retained by 325 mesh sieve | 6.3 | 4.0 | 1.7 |
| Through 325 mesh sieve | 87.6 | 94.1 | 96.9 |
| Total recovered | 99.8 | 99.9 | 99.8 |

From a comparison of penetrometer readings, screen analyses, and flow tests, we have reached the conclusion that the characteristic, distinguishing properties displayed by our novel nut products are attained when the grinding operation is carried out in such a way as to yield a product containing an oil-free meal, at least 85% of which will pass through a standard 325-mesh sieve, and at least 90% of which will also pass through a standard 200-mesh sieve. In examining the properties of the three products analyzed in Table II, it was found that samples 2 and 3 are clearly of the free-flowing, low-consistency variety, whereas sample 1 has a somewhat higher viscosity and a lower penetrometer reading, and therefore is transitional between the products of the prior art and the preferred products of this invention. The preferred embodiment of this invention, therefore, is a finely comminuted nut product at least 90% of the oil-free particles of which will pass through a 325-mesh standard sieve while less than 5% are retained by a standard 200-mesh sieve.

As mentioned above, the products of our invention have been compared by microscopic examination with the nut butters of the prior art with interesting results. Whereas the prior art products reveal large aggregates surrounded by a suspension of very much smaller particles, the products of this invention consist of a preponderance of exceedingly fine particles resulting from disrupted cell walls. More than 99% of the total number of microscopically visible particles passing through a 325-mesh screen are less than 10 microns in diameter, about 80% are 6 microns or less, and 60% are 4 microns or less in diameter. Quite unexpectedly it appears that, when subjecting nut meats to the action of colloid mills, a preponderance of the disrupted meal is reduced to particles having diameters much below the openings of the finest sieve available. In other words, once the particle size is reduced below that of the 325-mesh sieve, there is a tendency for the material to assume a surprisingly fine state of subdivision, perhaps corresponding to the natural dimensions of the component parts of the cellular structure of the nut substance.

The following examples, disclosing in detail how our novel products may be obtained, are given for illustrative purposes only. Our invention is not limited to the details set forth therein, but includes all modifications resulting in the products defined by the appended claims.

*Example I*

Shelled, roasted peanuts were first run through a blanching device to remove the hearts and skins.

They were then coarsely ground by passage through a household-type food chopper, after which the peanut mass was passed once through a Premier colloid mill with clearances set at 0.004 to 0.005 inch. There resulted a very smooth, syrupy product which showed excellent stability, no noticeable settling taking place after 12 hours of standing. It is eminently suitable for incorporation in various food products.

*Example II*

A batch of peanut butter of the usual stiff variety was run through a high speed hammer mill fitted with a fine mesh screen. The product obtained was very soft and smooth and had a consistency like that of a thick oil. Whereas the original peanut butter showed no flow characteristics at room temperature, the reground product was of such a consistency that it would flow out of a container when inverted. A penetrometer test was made both before and shortly after passage through the hammer mill, using the instrument and procedure described previously. The degree of penetration had been raised by the intensive regrinding treatment from about 27 mm. to 40.7 mm. After standing over night, the creamy product still gave a penetrometer reading of 38.9 mm.

A similar creamy nut product can also be obtained by substituting toasted and crushed pecan meats for the peanut butter used in the first part of this example.

*Example III*

A blend of 60% by weight of Spanish type and 40% runner type peanuts, freshly shelled, was heated for about 30 minutes at a temperature of 300° F. The roasted nuts were blanched mechanically to remove the skins and a portion of the hearts, after which they were fed into a series of mills, the first unit being for the purpose of reducing the mixture to a coarsely ground paste. This material was fed twice through a rotary colloid mill equipped with a carborundum rotor. The first time the clearance was set 0.010 inch, but on the second passage the clearance was set at 0.005 inch. The product of the second colloid mill grind flowed like oil and had a penetrometer reading of 38 mm. On screen analysis 93.5% of the oil-free particles passed through a 325-mesh sieve, when subjected to the standard test described previously.

The products of the colloid mill grindings in the foregoing example were evaluated in terms of their Stormer viscosities according to ASTM Method D-562-44, except that the viscosity was determined at 65° C. It was found that the product of the first colloid mill grind required a force of 925 grams to turn the standard Stormer stirring blade 100 revolutions in 30 seconds, while the product of the second colloid mill grind required a force of only 800 grams.

By way of contrast, ordinary peanut butter, such as the medium ground material, analyzed in the Table I above, is so stiff that the Stormer viscosimeter blade will not turn at all under a force amounting to 2500 grams. When this peanut butter is diluted to a 50–50 mixture with our free-flowing peanut product (of the second colloid mill grind above mentioned), the viscosity is still such as to require a force of 2175 grams to turn the instrument at the standard rate of 100 revolutions per 30 seconds. We have found by comparative tests of this kind that the viscosity range of our new products lies between 750 and 2500 grams on the Stormer viscosimeter, with a preferred range of between 750 and 1500 grams.

The methods of this invention are applicable to nuts and nut products, and to such leguminous products as peas and beans, especially those varieties which are used in food applications as nut substitutes. Our discoveries and their applications are especially pertinent to peanuts and peanut products, but may also be applied to almonds, pecans, cashew nuts and the like, and to soya beans and soya bean products. These may be processed either raw or in various degrees of cooking or roasting to produce the creamy, finely comminuted products of this invention.

Our new products are eminently suitable for incorporation in various food preparations, in order to impart flavor, additional nutrient value, or both. They show ample stability for these purposes, no noticeable settling of solid particles taking place within twelve hours' time. Because of their free-flowing characteristics and extremely fine particle size, they lend themselves far better to blending with other ingredients than do the relatively stiff, coarse and non-homogeneous prior art products. Up to 60% by weight of sugar may be incorporated therein to produce a hard sauce to be used on cakes, pies, etc. This is not possible with the commercially available nut butters which are too stiff to allow incorporation of an appreciable quantity of sugar.

Our products may be emulsified with water in varying proportions to furnish stable emulsions having physical characteristics varying from those of milk to those of a thick custard. They can be converted to soft, easily spreadable butters of heretofore unattained stability by the method disclosed in the copending application Serial No. 758,213 of Joseph F. Vincent. Said method involves the addition of stearic acid or hydrogenated peanut oil, water, and dextrose. These additions have a stiffening effect that is just what our products need to give them the optimum consistency, spreadability, etc. for use as a butter. These butters are so stable that there is no noticeable separation of oil, even after months of storage at 104° F.

As many apparently widely different embodiments of this invention may be made without departing from the spirit and scope hereof, it will be understood that the invention is not limited to the specific embodiments hereof except as defined in the appended claims.

We claim:

1. A free-flowing nut product derived wholly from nuts, composed of microscopic, nut particles suspended in nut oil, said particles being of such size that at least 85% by weight thereof will pass through a standard 325-mesh sieve, while at least 90% will also pass through a standard 200-mesh sieve.

2. A free-flowing peanut product derived wholly from peanuts, composed of microscopic peanut particles, said particles being of such size that at least 90% by weight thereof will pass through a standard 325-mesh sieve, while less than 5% are retained by a standard 200-mesh sieve.

3. A product as claimed in claim 2, wherein over 99% of the particles passing through the standard 325-mesh sieve are less than 10 microns in diameter.

4. A product as claimed in claim 2, further characterized by the fact that a standard cone-shaped penetrometer will penetrate its surface for a distance of from 35 to 41 mm. within one minute at a temperature of 25° C.

5. A method of preparing a free-flowing nut product, which comprises subjecting coarsely ground, shelled nuts to an intensive grinding, until the nut particles in the resultant product have been reduced to such size that at least 85% by weight thereof will pass through a standard 325-mesh sieve while at least 90% will also pass through a standard 200-mesh sieve.

6. A method of preparing a free-flowing peanut product, which comprises subjecting coarsely ground, shelled peanuts to intensive grinding, until the peanut particles in the resultant product have been reduced to such size that at least 90% by weight thereof will pass through a standard 325-mesh sieve, while less than 5% are retained by a standard 200-mesh sieve.

WILBUR A. LAZIER.
JOSEPH F. VINCENT.

REFERENCES CITED

The following references are of record in the file of this patent:

UNITED STATES PATENTS

| Number | Name | Date |
|---|---|---|
| 1,921,275 | Werner | Aug. 8, 1933 |
| 2,302,574 | Richardson et al. | Nov. 17, 1942 |
| 2,397,564 | Rosefield et al. | Apr. 2, 1946 |